United States Patent [19]

Hardage, Jr. et al.

[11] Patent Number: 5,781,916
[45] Date of Patent: Jul. 14, 1998

[54] CACHE CONTROL CIRCUITRY AND METHOD THEREFOR

[75] Inventors: James N. Hardage, Jr., Kyle; Glen A. Harris, Austin, both of Tex.

[73] Assignee: Motorola, Inc., Schaumburg, Ill.

[21] Appl. No.: 621,274

[22] Filed: Mar. 25, 1996

[51] Int. Cl.[6] ................................................ G06F 12/08
[52] U.S. Cl. ........................ 711/118; 711/143; 711/144
[58] Field of Search ................................ 395/440, 444, 395/445, 464, 467, 470, 471, 472, 473, 483, 495, 496, 497.04, 456; 711/118, 137, 140, 143, 144, 145, 146, 156, 168, 169, 129, 173

[56] References Cited

U.S. PATENT DOCUMENTS

| | | | |
|---|---|---|---|
| 5,353,426 | 10/1994 | Patel et al. | 395/445 |
| 5,379,396 | 1/1995 | Gochman et al. | 396/468 |
| 5,386,526 | 1/1995 | Mitra et al. | 395/403 |
| 5,420,994 | 5/1995 | King et al. | 395/471 |
| 5,530,941 | 6/1996 | Weisser et al. | 395/478 |
| 5,577,227 | 11/1996 | Finnell et al. | 395/449 |

OTHER PUBLICATIONS

DeLano, Eric et al., "A High Speed Superscaler PA-RISC Processor," IEEE, 1992, pp. 116-121.

Asprey, Tom et al., "Performance Features of the PA7100 Microprocessor," IEEE, Jun. 1993 pp. 22-35.

Hunt, Doug, "Advanced Performance Features of the 62-bit-PA-8000," IEEE, 1995, pp. 123-128.

Knebel, Patrick et al., "HP's PA7A7100LC: A Lov-Cost Superscaler PA-RISC Processor," IEEE, 1993, p. 441-447.

Primary Examiner—Eddie P. Chan
Assistant Examiner—Hiep T. Nguyen
Attorney, Agent, or Firm—Craig J. Yudell

[57] ABSTRACT

After a portion of a cache line has been zone written from a processor core (102) to a cache array (105), a read access received from the processor core (102) for one or more bytes within the cache line corresponding to the zone written data can be satisfied before a cache fill operation initiated by the zone written operation is completed. If the read access is for one or more bytes of the cache line which was not previously zone written, then the requested data is passed directly from the filling bus (113) to the processor core (102) as soon as it becomes valid on the filling bus (113). If the read access is for one or more bytes of the zone written data, then those one or more bytes are read from the cache array (105) to the processor core (102) regardless of the progress of the cache fill. All read accesses to filling cache lines are serviced in the minimum amount of time by satisfying the access immediately upon availability of only the exact portion requested.

6 Claims, 5 Drawing Sheets

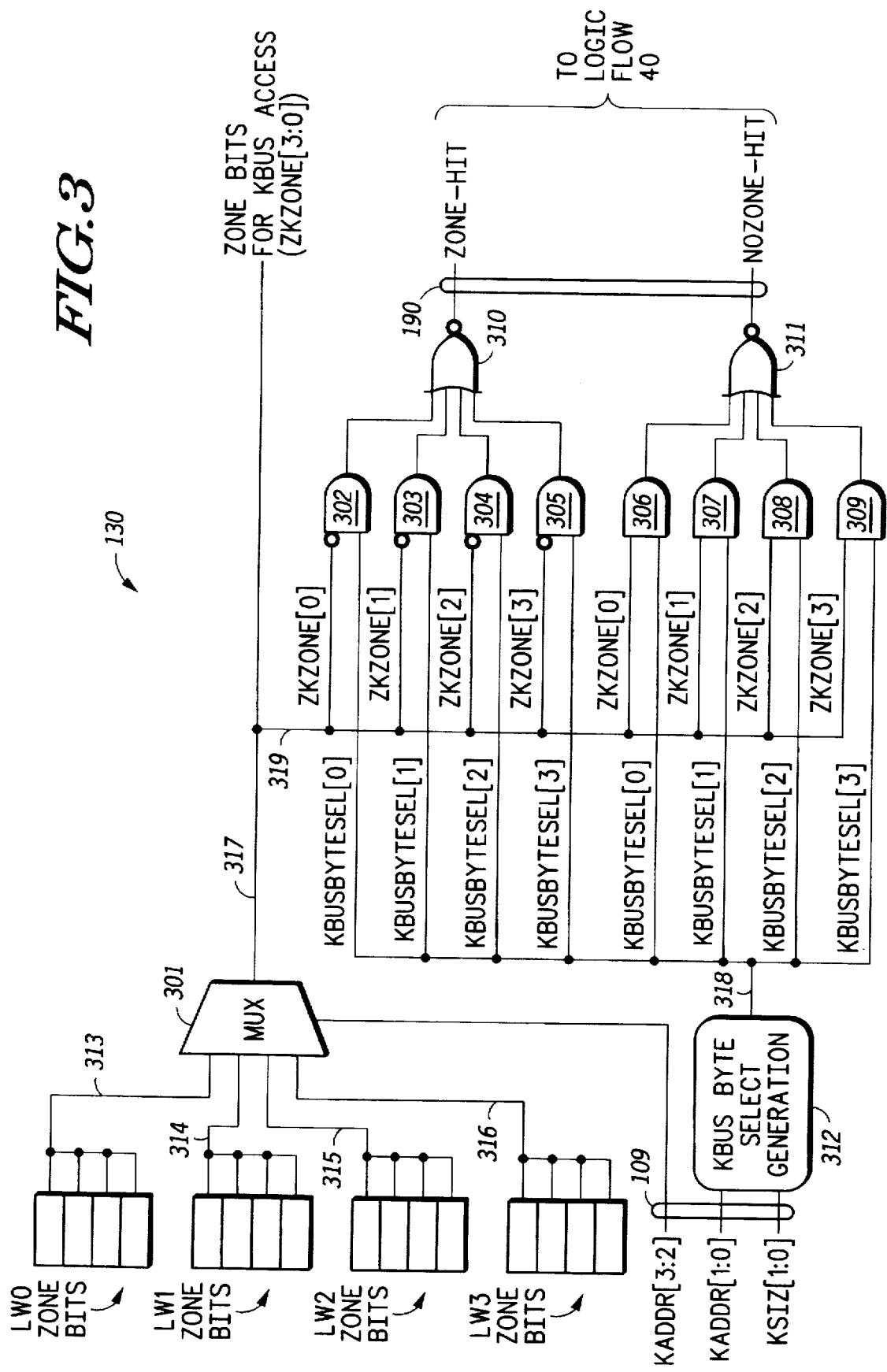

```
          BYTE
        0  1  2  3
    LW0 ▧  ▧  □  □
    LW1 □  □  □  □
    LW2 □  □  □  □
    LW3 □  □  □  □
```

□ INVALID DATA
▧ ZONE WRITTEN DATA

*FIG.5*

```
          BYTE
        0  1  2  3
    LW0 ▧  ▧  □  □
    LW1 □  □  □  □
    LW2 □  □  □  □
    LW3 □  □  □  □
```

□ INVALID DATA
▧ ZONE WRITTEN DATA

*FIG.6*

```
          BYTE
        0  1  2  3
    LW0 ▧  ▧  □  □
    LW1 □  □  □  □
    LW2 □  □  □  □
    LW3 □  □  □  □
```

□ INVALID DATA
▧ ZONE WRITTEN DATA

*FIG.7*

```
           BYTE
         0  1  2  3
    LW0  □  □  □  □   00
    LW1  □  □  □  □   01
    LW2  □  □  □  □   10    ADDR[3:2]
    LW3  □  □  □  □   11
        00 01 10 11
         ADDR[1:0]
```

*FIG.8*

CACHE CONTROL CIRCUITRY AND METHOD THEREFOR

TECHNICAL FIELD

The present invention relates in general to data processing systems, and in particular, to circuitry for controlling a cache.

BACKGROUND INFORMATION

Within a computer system, microprocessors (hereinafter also referred to as "processors" or "CPUs") often make use of one or more caches, which are special memory subsystems in which frequently used information (e.g., data and/or instructions) are held for quick access by the processor. When the processor references an address in memory, the cache checks to see whether it holds the data or instructions corresponding to that address. If the cache does hold the data or instruction corresponding to the address, this is referred to as a cache hit and the data or instruction is returned to the processor. If the cache does not hold the data or instruction, a cache miss occurs and a regular memory access occurs. When a cache hit occurs, an access to cache memory is faster than an access to main memory (e.g., RAM (random access memory) or system storage).

As the performance of microprocessors increases, the demand for a higher performance cache memory system increases. In high performance applications, cache control is typically designed to be non-blocking, that is, the cache can service cache hits during a cache fill operation. A cache fill is the action of fetching and writing a line of information in the cache due to a cache miss. To increase performance on write cycles, a zone write strategy may also be employed. A zone write allows a write to a cacheable line to terminate before the entire cache line is resident in the cache array, freeing the processor to perform other operations. There are two principal methods in the prior art to guarantee read data validity when employing a zone write strategy. In the first method, any read access must be serviced solely by data from the cache array; for example, any read access from the processor to the filling cache line must wait until the requested data is fetched from an external source (e.g., system memory), written into the cache array, read back out of the cache array, and delivered to the processor. In the second method, any read access can be serviced by a combination of data from the array and data from the filling bus; for example, any read access can be serviced when the array has been read and the fill has progressed to the point that the requested longword is valid on the filling bus.

For example, during a write operation, the processor will write information to the cache array. The cache will then retrieve from an external source the associated line and write the remainder (portion of the line not written by the processor) of the cache line into the cache array. FIG. 2 illustrates the prior art method for allowing a processor to read some of the information from a cache line being filled into the cache array. At step 21, a read access is received from the processor for information residing within the filling cache line. In one method, in step 22, the processor must wait for the data to fill the cache line in the cache array from the external source. Once the cache fill has completed, the requested portion may be read from the cache array at step 23. The process then ends at step 24. In a second method, in step 22, the processor must wait until the fill has progressed to the requested longword. Then at step 23, the array can be read and the data on the filling bus can be interleaved with the array data as appropriate to provide an entire longword composed of the most recent data to the processor. Note that the order of the fill progression versus array read (steps 22 and 23, respectively) can possibly be reversed. The criteria for satisfying the read is that both are -done, regardless of the order. Again, the process ends at step 24.

The problem with such prior art processes is that a read access from the processor occurring during a cache fill of a typical cache implementing a zone write strategy must stall either until the cache line that contains the data portion being read is fetched from the external source, written into the cache array, read back out of the array, and delivered to the processor, or in the least, until the fill progresses to the requested longword. Therefore, there is a need in the art for a more efficient system and method for a processor to perform a read access to a filling cache line.

BRIEF DESCRIPTION OF THE DRAWING

For a more complete understanding of the present invention, and the advantages thereof, reference is now made to the following description taken in conjunction with the accompanying drawings, in which:

FIG. 3 illustrates logic circuitry for producing homogeneous zone-hit and homogeneous nozone-hit signals in accordance with the present invention;

FIG. 5 illustrates an example of a homogeneous nozone-hit;

FIG. 6 illustrates an example of a homogeneous zone-hit;

FIG. 7 illustrates an example of a heterogeneous hit;

FIG. 8 illustrates a portion of the data array shown in FIG. 1; and

DETAILED DESCRIPTION

Figure 1:
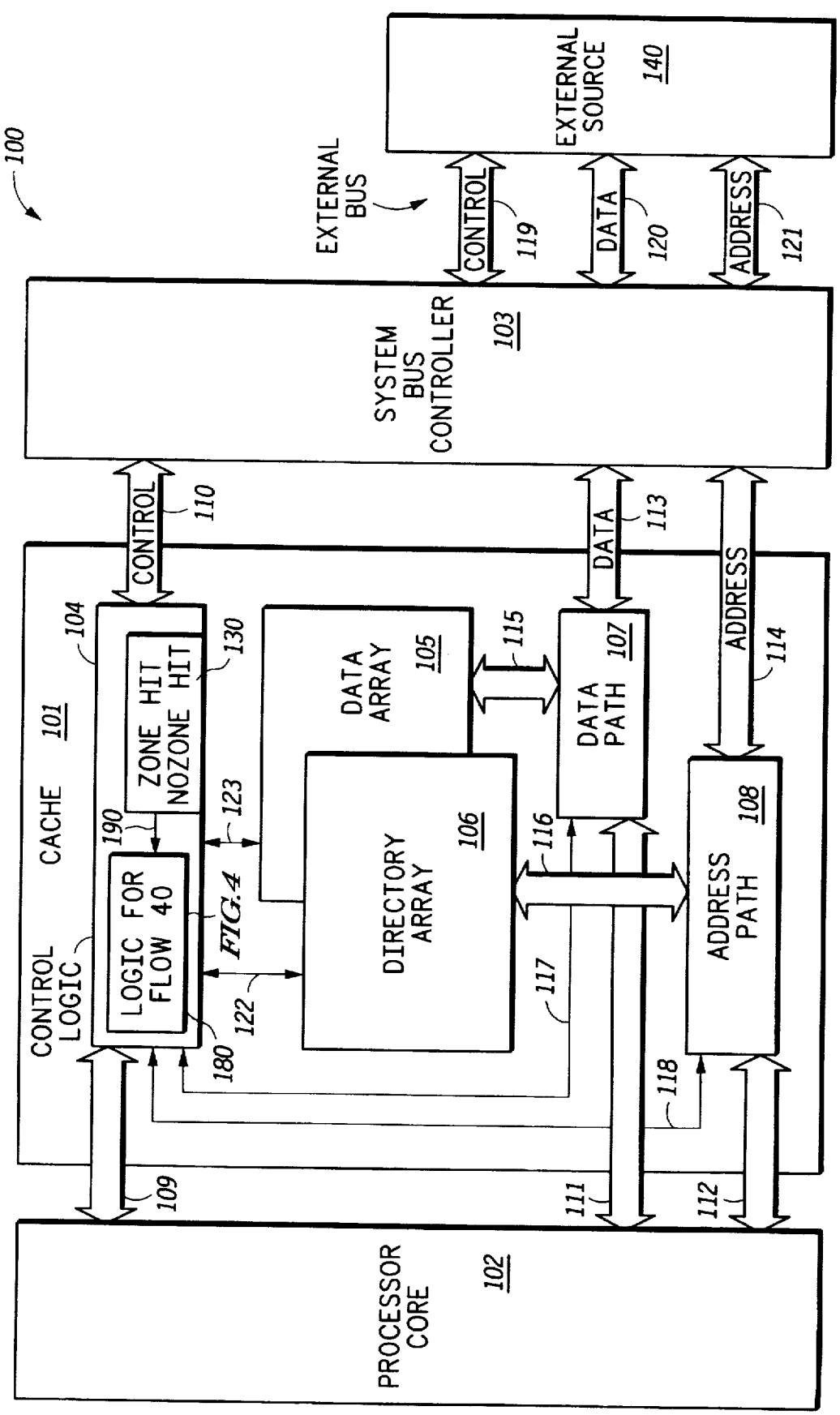
FIG. 1 illustrates, in block diagram form, a processor configured in accordance with the present invention.
Figure 2:
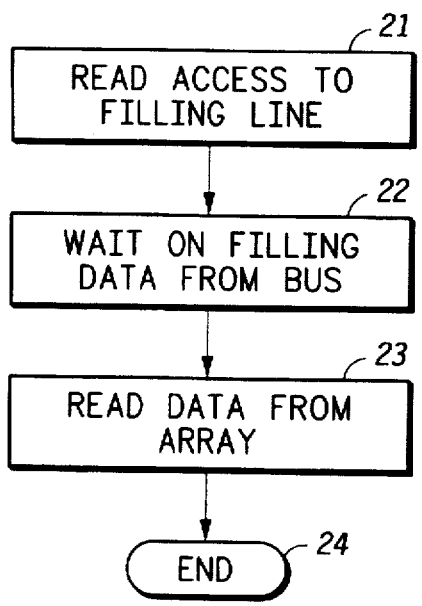
FIG. 2 illustrates a prior art method for performance of a read access to a cache line currently being filled.

In the following description, numerous specific details are set forth such as specific word or byte lengths, etc., to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Additionally, the following are definitions of terms used in this description and not previously defined:

entry—a single allocateable entity within a cache.

valid—an entity contains useable information.

hit—when there is a match of the address presented to the cache and a valid entry resident in the cache.

miss—when there is not a match of the address presented to the cache and a valid entry resident in the cache.

cache directory tag bits—the portion of an address retained in the cache to identify a cache entry.

cache directory dirty bits—indicate that a specific valid cache entry has been modified locally (within the cache) but not in main memory.

cache directory valid bits—indicate that a specific cache location has been allocated (an entry has been written to this location), and that entry has not been deallocated (removed from the cache).

homogeneous nozone-hit—a read transfer during a cache line fill that accesses information in the filling line where no portion of the entity accessed has been zone written.

homogeneous zone-hit—a read transfer during a cache line fill that accesses information in the filling line where the entire portion of the entity accessed has been zone written.

heterogeneous hit—a read transfer during a cache line fill that accesses information in the filling line and a first portion of the entity accessed has been zone written and a second portion of the entity accessed has not been zone written. neither a homogeneous nozone-hit nor a homogeneous zone-hit.

Refer now to the drawings wherein depicted elements are not necessarily shown to scale and wherein like or similar elements are designated by the same reference numeral through the several views.

Referring to FIG. 1, there is illustrated processor 100, which may be implemented within a single integrated circuit ("chip"), including processor core 102 coupled to cache 101, which is coupled to system bus controller 103. System bus controller 103 is coupled to an external (system) bus, which may be coupled to external source 140 (e.g., system memory). The external bus may be partitioned into control section 119, data section 120, and address section 121. Cache 101 includes cache control logic 104, data array 105, directory array 106, data path 107, and address path 108. Cache control logic 104 operates to control data array 105 by control bus 123. Control logic 104 controls the operation of directory array 106 by control bus 122. Likewise, data path 107 and address path 108 are controlled by control logic 104 by control busses 117 and 118, respectively.

Cache 101 may be a data cache, an instruction cache, or a unified cache (both data and instruction in combination).

Control logic 104 passes control data to and from processor core 102 by bus 109. Likewise, control information is passed between control logic 104 and system bus controller 103 by bus 110.

Data array 105 operates to store cached data or instructions. Directory array 106 operates in conjunction with data array 105 to store address and control information pertaining to each of the entries in data array 105. Such address and control information stored in directory array 106 might include such typical information as tag bits, dirty bits, and valid bits.

Data path 107 operates to control the flow of data or instructions to and from system bus controller 103 by bus 113, to and from processor core 102 by bus 111, and to and from data array 105 by bus 115. Address path 108 operates to control the flow of address information to and from system bus controller 103 by bus 114, to and from processor core 102 by bus 112, and to and from directory array 106 by bus 116.

In one embodiment of the present invention, data array 105 may be a 2K, 4-way set associative cache capable of holding 128 cache lines, wherein each cache line comprises four longwords (LWs). A cache fill operation typically retrieves one cache line in four discrete units from external source 140 via the external bus (119, 120, 121). A cache line is shown in FIG. 8. Each longword (LW0, LW1, LW2, LW3) may be comprised of 4 bytes (0, 1, 2, 3). Accesses by processor core 102 may be for one particular byte, one word (2 bytes), or a longword.

The present invention is applicable to processors implementing zone write operations. With such a zone write operation, as each byte is written into the cache array from a write operation of one or more bytes from processor core 102, a zone bit is asserted for each byte. For example, processor core 102 may commence a zone write operation by writing bytes 0 and 1 into LW0 of the cache line. Cache 101 will then retrieve the associated cache line from a source external to processor 100 and write the remaining bytes of the cache line (bytes 2, 3 of LW0, all bytes of LW1, LW2, and LW3) into data array 105. When the write operation from processor core 102 is completed, the zone bits associated with bytes 0 and 1 of LW0 are asserted. These zone bits are used during the fill to prevent the core-written bytes from being overwritten by the filling cache line.

As briefly discussed in the Background Information, in prior art systems, if processor core 102 performs a read access to any one of the bytes within a filling cache line (possibly subjected to a previous zone write) the read access from processor core 102 may be unduly stalled during the cache fill operation. Only when the cache fill operation has terminated, or at least completed the fetch of the requested longword, will the read access be serviced.

In contrast with the present invention, a read access from processor core 102 will stall only until the amount of data being requested is valid in data array 105 or on the filling bus (i.e., bus 113). This approach can reduce read latency by a maximum that depends on the wait states during the fill operation.

Using the approach of the present invention, a read access of data in a filling cache line can be classified into three categories:

1. Homogeneous zone-hit
2. Homogeneous nozone-hit
3. Heterogeneous hit

Zone bits, in addition to their standard use in preventing zone written data from being overwritten by a filling cache line, are used to determine which bytes within a filling cache line are valid during accesses of data within the filling cache line. The zone bits are used to control the flow of data to processor core 102 and the homogeneous nozone-hit and homogeneous zone-hit signals produced by the logic described below with respect to FIG. 3 are used in determining when termination of a read access is possible. A read access of data in a filling line is terminated when the bytes needed to satisfy the read are valid, not necessarily when an entire longword or line is cache resident and valid.

FIG. 5 illustrates an example of a homogeneous nozone-hit. The invalid data has not been zone written and has not yet been written with fill data from external source 140. A longword read of address 4 (as specified by FIG. 8, and as indicated by the bold outlined box in FIG. 5) would be a homogeneous nozone-hit and would be serviced immediately upon arrival of the requested longword during the fill.

Referring next to FIG. 6, an example of a homogeneous zone-hit is shown. A word read of address 0 (indicated by the bold outlined box) would be a homogeneous zone-hit and would be serviced immediately upon reading the array, irrespective of the progress of the line fill.

Referring next to FIG. 7, an example of a heterogeneous hit is shown. A longword read of address 0 (indicated by the bold outlined box) would be a heterogeneous hit comprising both invalid data and zone written data and would be serviced as soon as both the previously written portion could be read from the array and the remaining portion arrives on the filling bus.

Figure 4:
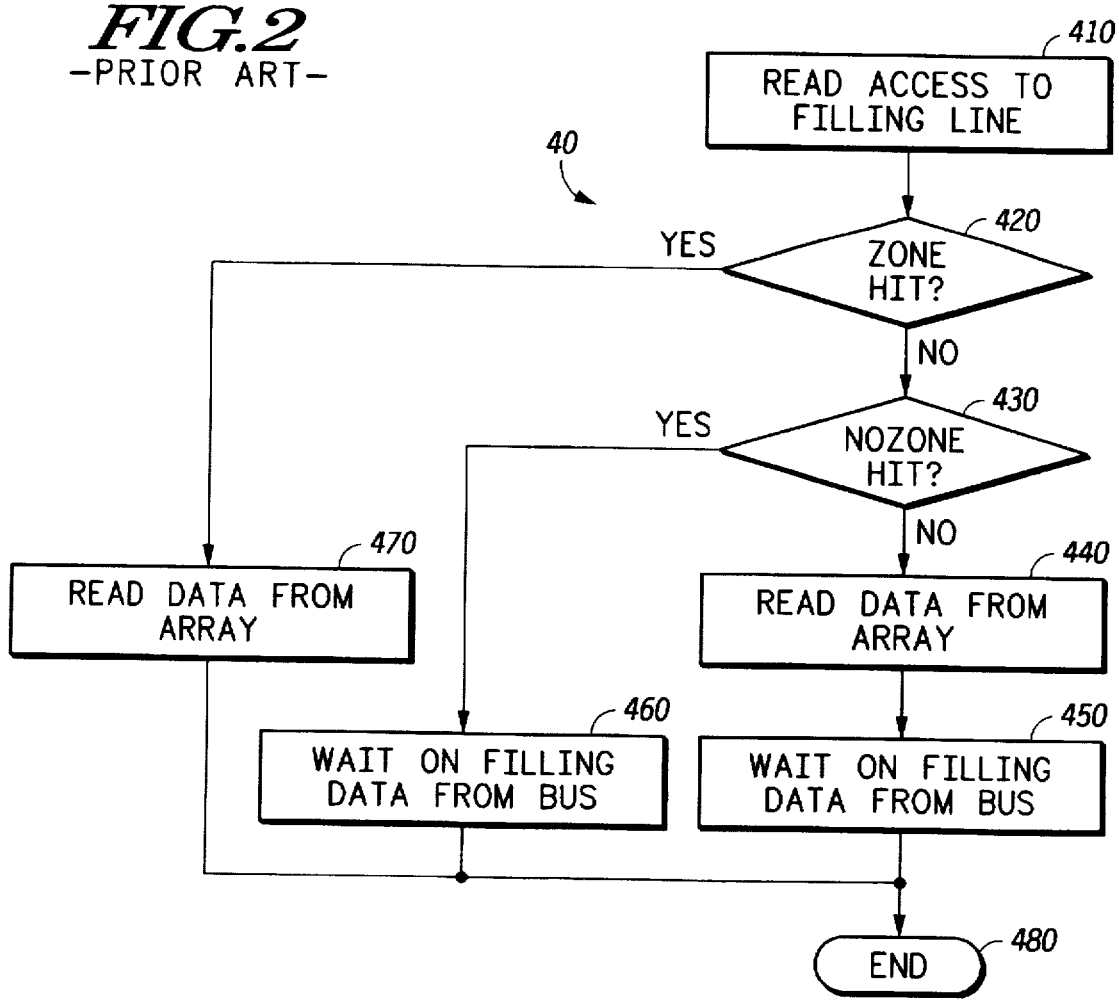
FIG. 4 illustrates a flow diagram of a read access to a cache line currently being filled in accordance with the present invention.

Referring next to FIG. 4, there is illustrated a flow diagram of process 40 for performing read accesses during a cache fill operation in accordance with the present invention. Process 40 may be embodied in logic circuitry 180 within control logic 104.

At step 410, a read access for one or more bytes residing within the filling cache line is received by control logic 104 from processor core 102. If in step 420, it is determined that a homogeneous zone-hit has not occurred due to the read access of step 410, then control logic 104 will proceed to step 430 to determine whether or not the read access has resulted in a homogeneous nozone-hit. The determinations in steps 420 and 430 are made as a function of the values for the ZONE-HIT and NOZONE-HIT signals produced by logic circuitry 130 in FIG. 3, which passes these values via connection 190 to logic circuitry 180.

If a homogeneous nozone-hit has not occurred, then control logic 104 will service the read with a combination of data from data array 105 and data from filling bus 113. This case is a heterogeneous hit as described in FIG. 7. In step 440, data array 105 can be read for the cache resident zone written data. Then in step 450, processor core 102 will wait until the fill progresses to the requested longword when data on filling bus 113 will be interleaved with the array data as appropriate and the read access terminated. Note that the order of the fill progression versus the array read can possibly be reversed. The process then ends at step 480.

If in step 430, a homogeneous nozone-hit has occurred, as described in FIG. 5, control logic 104 will proceed to step 460 and will wait until the fill operation has progressed to the requested longword and then terminate the read access. The data from filling bus 113 is the only requirement needed to service the read and is delivered to core 102 immediately upon its arrival on filling bus 113. The process then ends at step 480.

If in step 420, control logic 104 determines that a homogeneous zone-hit has occurred, as described in FIG. 6, then control logic 104 will proceed to step 470 to read the requested data or instruction from data array 105. In the present example, if the read access was for the previously zone written bytes 0 and 1 of LW0, then the data residing within bytes 0 and 1 of LW0 would be retrieved from data array 105 along bus 115, data path 107, and bus 111 to processor core 102. Note that bytes 2 and 3 of LW0 may be invalid. An important fact to note is that the amount of data requested by processor core 102 is valid and the minimum set of data is used to satisfy the request of core 102. There is no stall due to waiting for the fill operation to complete or even for the fill operation to progress to the requested longword.

Figure 9:
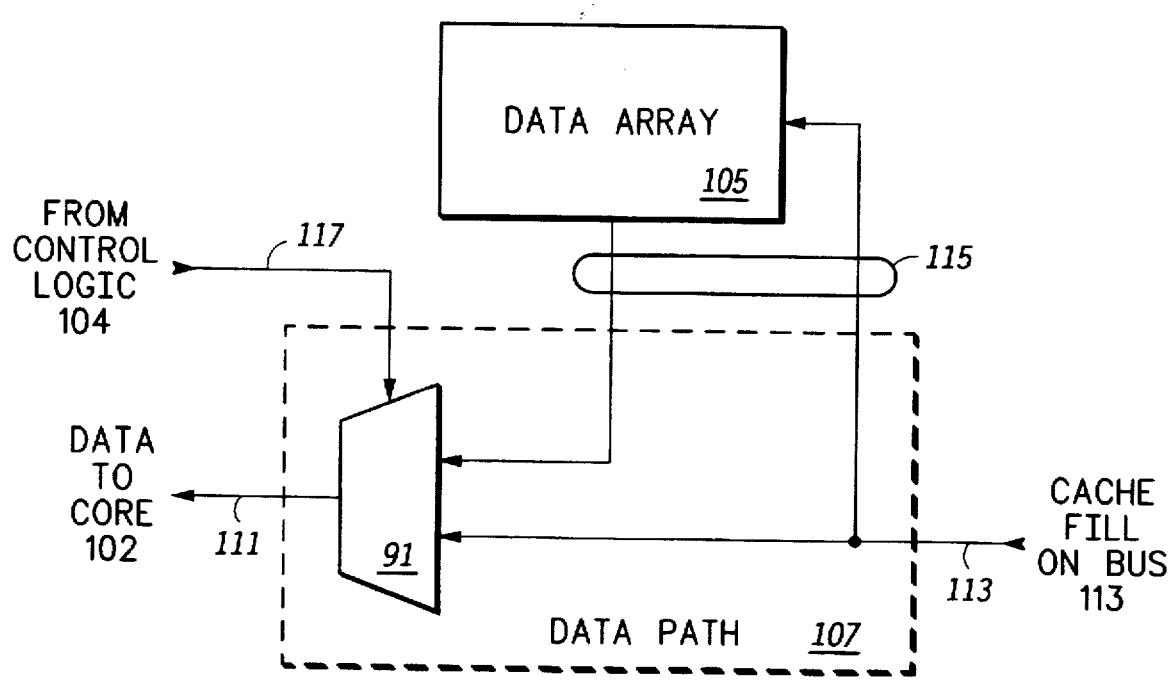
FIG. 9 illustrates a portion of the processor shown in FIG. 1.

Referring to FIG. 9, there is shown a portion of processor 100 for performing flow 40 indicated by FIG. 4. For steps 440 and 450, some combination of filling data received on bus 113 and array read data on bus 115 proceeds to processor core 102 along bus 111. This is implemented by control logic 104 on control line 117 to multiplexer (mux) 91. For example, steps 440 and 450 operate mux 91 to choose the zone written data from bus 115 and the incoming fill data from bus 113 to be passed on to processor core 102, i.e., the read access is a heterogeneous hit.

Using the example in FIG. 7, if processor core 102 sends a read access for LW0, this read access will be satisfied by a combination of array read data from bus 115 and filling data from bus 113 through mux 91 onto bus 111 to processor core 102.

Referring again to FIG. 9, for step 460, the filling data received on bus 113 proceeds to fill the remainder of the cache line in data array 105 and is also permitted to directly proceed to processor core 102 along bus 111. This is implemented by control logic 104 on control line 117 to multiplexer (mux) 91. For example, step 460 operates mux 91 to choose the incoming data received from bus 113 to be passed on to processor core 102, i.e., the access is a homogeneous nozone hit.

Using the example illustrated in FIG. 5, if processor core 102 sends a read access for LW1, this read access will be satisfied by the direct transmission of LW1 from bus 113 through mux 91 onto bus 111 to processor core 102.

Referring again to FIG. 9, for step 470, the array read data from data array 105 on bus 115 proceeds directly to processor core 102 along bus 111. This is implemented by control logic 104 on control lines 117 to mux 91. For example, step 470 operates mux 91 to choose the array read data from bus 115 to be passed on to processor core 102.

Using the example illustrated in FIG. 6, if processor core 102 sends a read access for bytes 0 and 1 of LW0, this read access will be satisfied by the direct transmission of bytes 0 and 1 of LW0 from bus 115 through mux 90 onto bus 111 to processor core 102. The direct transmission of the requested data from bus 115 to processor core 102 can be performed since the entire portion of the requested data has been zone written, i.e., the read access is a homogeneous zone-hit.

Referring next to FIG. 3, there is illustrated a logic diagram of logic circuitry 130 within control logic 104 for producing the homogeneous zone-hit and homogeneous nozone-hit signals used by the logic circuitry implementing process 40.

Logic circuitry 130 includes buses 313–316, which are the zone bits for the filling cache line. As described above with respect to FIG. 8, there is a zone bit for each byte of each longword of the filling line. Note that there are 16 zone bits in the entire system that are always associated with the line currently being filled.

Buses 313–316 are coupled to the inputs of multiplexer 301, which is controlled by the receipt of an address, kaddr[3:2], received from processor core 102 along bus 109. These address signals are a portion of the address corresponding to the read access of step 410. The kaddr[3:2] signal is capable of addressing one of the longwords [LW0, LW1, LW2, LW3], and is used by multiplexer (mux) 301 to select the zone bits corresponding to the longword in which the core requested read data (byte, word, or longword) resides. These longword indexed zone bits are denoted by bus 317. For example, kaddr[3:2] will control mux 301 to select the zone bits corresponding to LW0 output onto bus 317 from bus 313 if the read access is for one or more of the bytes residing within LW0.

KBus byte select generation logic 312 receives another two bits of the read access address, kaddr[1:0], and a 2-bit signal corresponding to the size of the data requested by the core read access, ksiz[1:0]. These signals are also received from processor core 102 along bus 109 into control logic 104, specifically logic circuitry 130. Logic circuitry 312 produces a 4-bit signal to be transmitted on bus 318 in response to receipt of kaddr[1:0] and ksiz[1:0]. The 4-bit signal generated from logic circuitry 312 indicates which bytes of the addressed longword have been requested in step 410. For example, if the read access of step 410 is for bytes 2 and 3 of longword 2 (LW2), then kaddr[3:2] sent to multiplexer 301 will select the zone bits received by bus 315. Furthermore, kaddr[1:0] will be that portion of the read address for addressing byte 2 of LW2. Additionally, signal ksiz[1:0] received from processor core 102 will indicate that the read access is requesting two bytes. In response to these signals, logic circuitry 312 will output 1100 (binary, designated as kbusbytesel[3:0]).

Thus, for any longword corresponding to a read access (any byte, word, or longword read resides within some longword boundary), logic circuitry 312 will produce a 4-bit signal where asserted bits within the 4-bit signal correspond to those bytes within the longword to be retrieved by the read access, while those bytes not a part of the read access will have corresponding negated bits within the 4-bit signal on bus 318.

In another example, if the read access is for an entire longword, whether or not that longword is LW0, LW1, LW2, or LW3, the 4-bit signal output onto bus 318 by logic circuitry 312 will be 1111 (binary).

The kbusbytesel[3:0] signal is sent to one input of each of gates 302–305 and to one input of each of gates 306–309. Gates 306–309 may each be an AND gate, while logic gates 302–305 may each be an AND gate where one of the inputs is inverted. These inverted inputs receive the longword indexed zone bits (zkzone[3:0]) output onto bus 317 from mux 301. These zone bits are also sent to the other input of logic gates 306–309.

The outputs of logic gates 302–305 are inputted into NOR gate 310, while the outputs of logic gates 306–309 are inputted into NOR gate 311. NOR gate 310 produces the homogeneous zone-hit signal, and NOR gate 311 produces the homogeneous nozone-hit signal. These signals are used in logic circuitry 104 implementing flow 40, specifically generating inputs used in steps 420 and 430, as previously described.

For example, referring to both FIGS. 3, 5 and 6, if the read access is for all 4 bytes of LW1, then the zone bits of LW1 are selected by multiplexer 301 and delivered along bus 317 and 319 to logic gates 302–309 (zkzone[3:0]=0000 (binary) ). kbusbytesel[3:0] produced by logic circuitry 312 onto bus 318 will be 1111 (binary), and will be supplied to the other inputs of logic gates 302–309. The result is that NOR gate 310 will output a deasserted homogeneous zone-hit signal, while NOR gate 311 will output an asserted homogeneous nozone-hit signal. The homogeneous nozone-hit signal and homogeneous zone-hit signal are used by control logic 104 to determine when the read access can be terminated. The longword indexed zone bits (zkzone[3:0]) output on bus 317 are used to control the flow of data to service the read via control bus 117 on FIG. 9.

Although the present invention and its advantages have been described in detail, it should be understood that various changes, substitutions and alterations can be made herein without departing from the spirit and scope of the invention as defined by the appended claims. For example, it should be understood that the present invention may be applied to data, instruction, and unified (both instruction and data) caches.

We claim:

1. A processor comprising:

a processor core;

a cache array;

a bus interface unit;

a data path coupling said bus interface unit to said cache array and coupling said bus interface unit to said processor core and coupling said cache array to said processor core; and control circuitry, coupled to said processor core and to said cache array and to said data path, for controlling said cache array, wherein said control circuitry comprises:

circuitry for receiving a zone write of information from said processor core to said cache array;

circuitry for initiating a cache fill operation to said cache array of a remainder of a cache line corresponding to said information zone written from said processor core to said cache array;

circuitry for receiving a read access from said processor core for a portion of a cache line presently filling to said cache array; and circuitry for sending said portion of said cache line to said processor core before said cache filling operation is completed and for responding to said read access by reading said portion of said cache line from said cache array when said portion of said cache line is part of information previously zone written from said processor core to said cache array and for determining that said read access results in a zone hit, wherein said determining circuitry comprises:

a multiplexer having its inputs coupled to zone bits associated with said cache line in said cache array, said multiplexer controlled by a first portion of an address associated with said read access;

logic circuitry for producing a logic signal in response to receipt of a second portion of said address associated with said read access, wherein said logic signal corresponds to said portion of said cache line requested by said read access; and a set of logic gates receiving an output of said multiplexer and receiving said logic signal, wherein said set of logic gates produce a zone-hit signal indicating whether said read access has resulted in said zone hit.

2. The processor as recited in claim 1, wherein said sending circuitry comprises:

circuitry for responding to said read access by reading said portion of said cache line from a bus transmitting a remainder of said cache line from an external source to said cache array when said portion is not part of information zone written from said processor core to said cache array.

3. The processor as recited in claim 2, wherein said portion is passed to said processor core simultaneous with being written to said cache array.

4. The processor as recited in claim 2, wherein said responding circuitry comprises:

circuitry for determining that said read access results in a nozone hit.

5. The processor as recited in claim 4, wherein said determining circuitry comprises:

a multiplexer having its inputs coupled to zone bits associated with said cache line in said cache array, said multiplexer controlled by a first portion of an address associated with said read access;

logic circuitry for producing a logic signal in response to receipt of a second portion of said address associated with said read access, wherein said logic signal corresponds to said portion of said cache line requested by said read access; and a set of logic gates receiving said output of said multiplexer and receiving said logic signal, wherein said set of logic gates produce a nozone-hit signal indicating whether said read access has resulted in said nozone hit.

6. The processor as recited in claim 1, wherein said sending circuitry comprises:

circuitry for responding to said read access by reading a first part of said portion of said cache line from said cache array, and reading a second part of said portion of said cache line from a bus transmitting a remainder of said cache line from an external source to said cache array when (1) said first part of said portion of said cache line is part of information zone written from said processor core to said cache array and (2) said second part of said portion is not part of said information zone written from said processor core to said cache array.

* * * * *